(12) United States Patent
Shinjo et al.

(10) Patent No.: US 7,053,605 B2
(45) Date of Patent: May 30, 2006

(54) ROTATION INFORMATION DETECTING APPARATUS WITH NOISE SUPPRESSION CIRCUIT

(75) Inventors: Izuru Shinjo, Tokyo (JP); Yoshinori Tatenuma, Tokyo (JP); Masahiro Yokotani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 59 days.

(21) Appl. No.: 10/971,108

(22) Filed: Oct. 25, 2004

(65) Prior Publication Data

US 2005/0270019 A1 Dec. 8, 2005

(30) Foreign Application Priority Data

Jun. 4, 2004 (JP) .......................... P2004-167536

(51) Int. Cl.
*G01B 7/30* (2006.01)
(52) U.S. Cl. .............................. 324/207.25; 324/207.2; 324/207.21
(58) Field of Classification Search ........... 324/207.12, 324/207.2, 207.21, 207.25, 207.24, 252, 324/160, 166, 173, 174; 338/32 R, 32 H
See application file for complete search history.

(56) References Cited

U.S. PATENT DOCUMENTS 5,289,089 A * 2/1994 Aoki .......................... 318/254
6,177,793 B1 * 1/2001 Shinjo et al. .......... 324/207.25

FOREIGN PATENT DOCUMENTS

JP 54-123825 * 9/1979
JP 11-304416 A 11/1999

* cited by examiner

*Primary Examiner*—Jay M. Patidar
(74) *Attorney, Agent, or Firm*—Sughrue Mion, PLLC (57) ABSTRACT

There is provided a rotation information detecting apparatus which suppresses noise superimposed on an output line and can prevent detection of erroneous rotation information. A periodic changing magnetic field is applied to a detection element according to the rotation of a rotation object, and rotation information is detected. A signal processing circuit includes an output circuit for generating a binary output signal changing between a high level and a low level according to the rotation of the rotation object. The output circuit includes an output transistor, an output line connected to the output transister, a power supply terminal for the output transistor, and a noise suppression circuit connected between the output line and the power supply terminal a power supply terminal. The noise suppression circuit includes a diode and a current limiting resistor.

7 Claims, 8 Drawing Sheets

ROTATION INFORMATION DETECTING APPARATUS WITH NOISE SUPPRESSION CIRCUIT

BACKGROUND OF THE INVENTION

1. Field of the Invention

The present invention relates to a rotation information detecting apparatus which generates a periodic changing magnetic field according to the rotation of a rotation object and detects rotation information of the rotation object on the basis of the periodic changing magnetic field. The rotation object is, for example, an internal combustion engine and the invention is applied to a use for generating rotation angle information of this internal combustion engine.

2. Description of the Related Art

For example, JP-A-11-304416 (called a conventional art) discloses a first kind of detecting apparatus in which a magnetic resistance element (called an MR element) is a detection element. This MR element is such that its electric resistance value is changed according to a change in direction of magnetic flux intersecting with a current direction in a ferromagnetic thin film, and the direction change of the magnetic flux to the ferromagnetic thin film is given according to the rotation of a rotation object, so that a detection signal in response to the direction change of the magnetic flux is generated.

Besides, the conventional art discloses a second kind of detecting apparatus in which a hall element is a detection element. This hall element generates a detection signal according to an intensity change of magnetic flux given thereto.

Each of the first and the second kind of detecting apparatuses disclosed in the conventional art includes a signal processing circuit for converting the detection signal generated in the detection element into a binary output signal changing between a high level and a low level. The signal processing circuit includes an output transistor for generating the binary output signal, the output transistor is connected to an output line, and the output signal is outputted in this output line. The output signal changes between the high level and the low level in response to the periodic changing magnetic field between a concave part and a convex part formed on the peripheral surface of a rotation plate rotating together with the rotating object to be detected. In a state where the periodic changing magnetic field does not change, the output signal keeps the high level or the low level.

However, in the first and the second kind of detecting apparatuses disclosed in the conventional art, there is a problem that when noise is superimposed on the output line at the time when the output line keeps the high level, the potential of the output line is erroneously changed from the high level to the low level by this noise. This erroneous potential change of the output line gives an error to detected rotation information, and causes a disadvantage that the erroneous rotation information is detected.

SUMMARY OF THE INVENTION

The object of the invention is to propose an improved rotation information detecting apparatus which prevents unnecessary variation of an output line due to noise, and can detect rotation information more accurately.

A rotation information detecting apparatus according to the invention is a rotation information detecting apparatus which generates a periodic changing magnetic field according to rotation of a rotation object and detects rotation information of the rotation object on the basis of the periodic changing magnetic field. The rotation information detecting apparatus has a signal processing circuit for generating a binary output signal changing between a high level and a low level according to the rotation of the rotation object. The signal processing circuit includes an output transistor, an output line, a power supply terminal and a noise suppression circuit. The output transistor generates the binary output suignal. The output line is connected to the output transistor for outputting the binary output signal. The power supply terminal is for the output transistor. The noise suppression circuit is connected between the output line and the power supply terminal for by-passing noise superimposed on the output line to the power supply terminal.

In the rotation information detecting apparatus of this invention, the noise suppression circuit is connected between the output line and the power supply terminal for by-passing the noise superimposed on the output line to the power supply terminal. As a result, the noise superimposed on the output line is by-passed to the power supply terminal through the noise suppression circuit. Accordingly, it is possible to prevent, for example, the output line at the high level from being changed to the lower level by the noise, and the detection of erroneous rotation information due to the noise can be prevented.

BRIEF DESCRIPTION OF THE DRAWINGS

FIGS. 5($a$) to 5($f$) show the operation of the signal processing circuit in embodiment 1, in which FIGS. 5($b$) to 5($f$) show signal waveforms of respective parts corresponding to positions of concave parts and convex parts shown in FIG. 5($a$).

FIGS. 6($a$) and 6($b$) are signal waveform views showing the operation of a noise suppression circuit of embodiment 1.

FIGS. 9($a$) to 9($f$) show the operation of the signal processing circuit in embodiment 3, in which FIGS. 9($b$) to 9($f$) show signal waveforms of respective parts corresponding to positions of convex parts and concave parts shown in FIG. 9($a$).

DETAILED DESCRIPTION OF THE INVENTION

Hereinafter, some embodiments of the invention will be described with reference to the drawings.

EMBODIMENT 1

Figure 1:
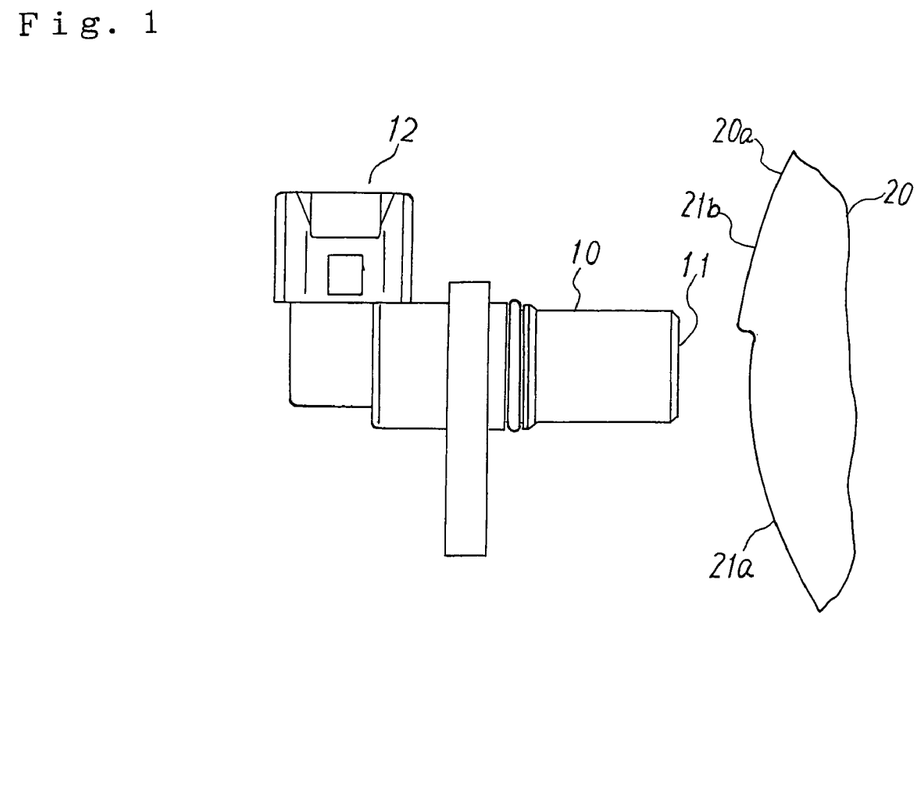
FIG. 1 is a side view of a rotation information detecting apparatus of embodiment 1 of the invention.

First, a rotation information detecting apparatus of embodiment 1 of the invention will be described. FIG. 1 is a side view showing the whole of the rotation information detecting apparatus of embodiment 1, and FIG. 2 is a side sectional view showing its inside.

The rotation information detecting apparatus of embodiment 1 is attached to an internal combustion engine, and detects rotation angle information of the internal combustion engine. In other words, in this embodiment 1, a rotation object to be detected is the internal combustion engine, and the rotation angle information of the rotation object is detected. The rotation information detecting apparatus of this embodiment 1 includes a cylindrical case 10 and a rotation plate 20. The rotation plate 20 is driven by the rotation object to be detected, that is, the internal combustion engine, and rotates together with the internal combustion engine.

The cylindrical case 10 is made of synthetic resin, and as shown in FIG. 1, a detection part 11 is formed at its right end and a terminal part 12 is formed at its left end. The detection part 11 is opposite to an outer peripheral surface 20a of the rotation plate 20 through a gap G. A binary output signal S6 of the detecting apparatus is outputted in the terminal part 12. A not-shown computer unit is connected to the terminal part 12, the binary output signal S6 is supplied to this computer unit, and a rotation angle of the internal combustion engine is detected in this computer unit.

Figure 2:
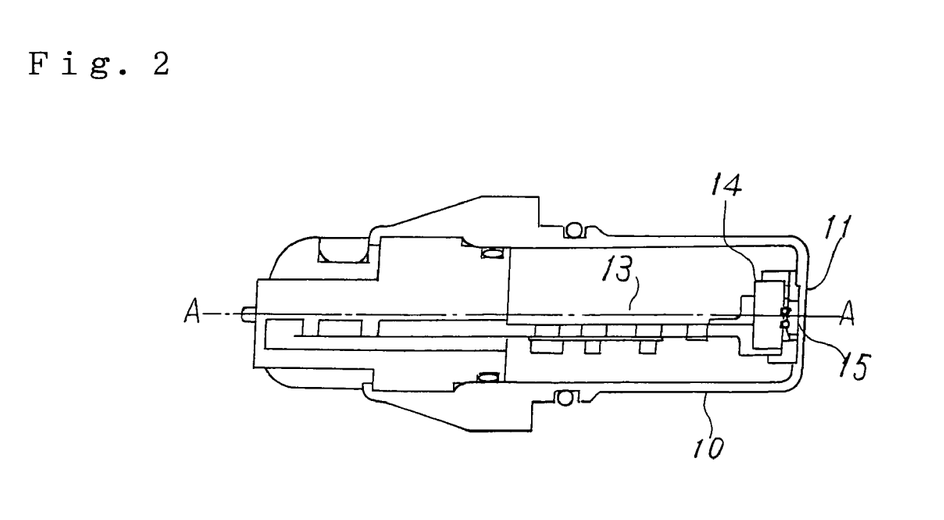
FIG. 2 is a side sectional view of the detecting apparatus of embodiment 1.

As shown in FIG. 2, the cylindrical case 10 extends along axial line A—A, and an electric circuit board 13, a permanent magnet 14, and a detection element 15 are disposed in this case 10. A signal processing circuit 100 including semiconductor integrated circuit elements, a resistance elements, and a capacitor elements is mounted on the electric circuit board 13. The permanent magnet 14, together with the detection element 15, is disposed in the detection part 11.

The permanent magnet 14 is magnetized in the direction of the axial line A—A of the cylindrical case 10, and the detection element 15 is disposed at the outside end surface of the permanent magnet 14. The rotation plate 20 is made of a magnetic body such as an iron plate, and on the outer peripheral surface 20a, concave parts 21a and convex parts 21b are alternately formed along the outer peripheral surface 20a in order to apply a changing magnetic field to the detection element 15 according to the rotation thereof. The plural concave parts 21a and the plural convex parts 21b are formed on the outer peripheral surface 20a of the rotation plate 20. The concave parts 21a and the convex parts 21b are alternately formed at a predetermined angle pitch on the outer peripheral surface 20a of the rotation plate 20.

The detection element 15 is a magnetic detection element. With the rotation of the rotation plate 20, the magnetic flux from the permanent magnet 14 is made a changing magnetic field periodically changing, and this changing magnetic field is applied to the detection element 15. The detection element 15 receives this changing magnetic field and generates a detection signal. In embodiment 1, as the detection element 15, a pair of magnetic resistance elements whose electric resistance value is changed by the changing magnetic field is used.

The magnetic resistance element is called an MR element. The MR element includes a ferromagnetic thin film made of, for example, nickel-iron (Ni—Fe), nickel-cobalt (Ni—Co), or the like, and the electric resistance value is changed according to an angle between a current direction and a magnetization direction in this ferromagnetic thin film. In the case where the MR element is used as the detection element 15, a specific current in a specified direction is made to flow through the ferromagnetic thin film, and the magnetic flux from the permanent magnet 14 is given to intersect with the direction of this current. The magnetic flux from the permanent magnet 14 is made the changing magnetic field by the rotation of the rotation plate 20. This changing magnetic field includes a direction change of the magnetic flux and an intensity change thereof, and the direction change of the magnetic flux changes the magnetization direction intersecting with the direction of the current in the ferromagnetic thin film.

Specifically, the convex part 21b of the rotation plate 20 functions to attract the magnetic flux from the permanent magnet 14, and the convex part 21b, together with the rotation plate 20, rotates. The convex part 21b approaches the detection element 15 according to the rotation of the rotation plate 20, and then, goes away from the detecting element 15. This convex part 21b approaches the detection element 15, and goes away from the detection element 15, so that the changing magnetic field having the direction change of the magnetic flux and the intensity change of the magnetic flux is applied to the detection element 15. In the MR element, the angle between the current direction and the magnetization direction in the ferromagnetic thin film is changed on the basis of the direction change of the magnetic flux in the changing magnetic field, and the electric resistance value is changed according to the change of the angle.

Figure 3:
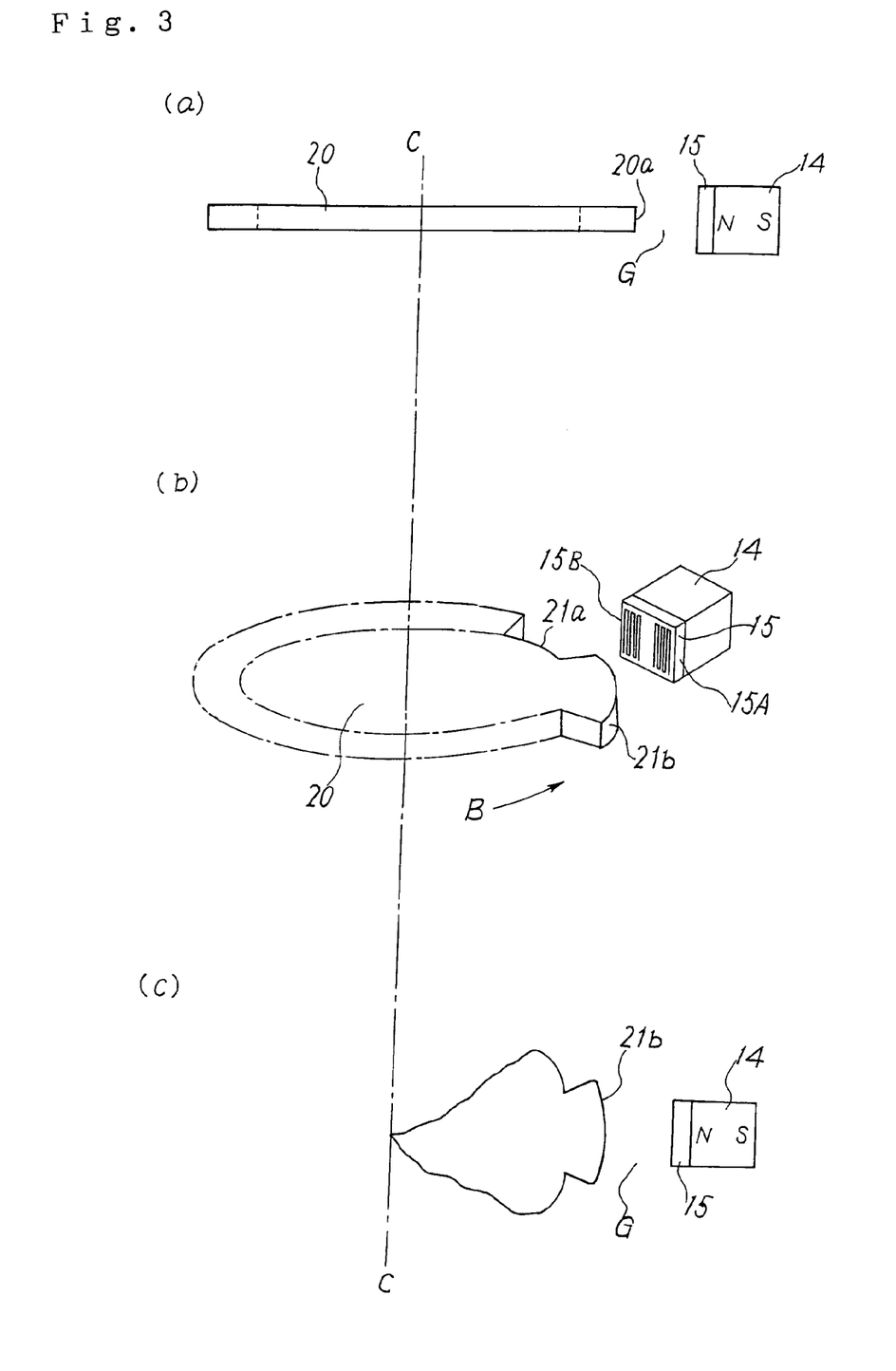
FIGS. 3A to 3C are schematic views of a magnetic circuit in embodiment 1.

FIGS. 3(a) to 3(c) are schematic views showing a magnetic circuit in the rotation information detecting apparatus of embodiment 1 shown in FIGS. 1 and 2. The schematic views of FIGS. 3(a) to 3(c) show the relation among the permanent magnet 14, the detection element 15, and the rotation plate 20. FIG. 3(a) is a side view of those, FIG. 3(b) is a perspective view of those, and FIG. 3(c) is a top view of part of those. A pair of MR elements 15A and 15B are used as the detection element 15.

As shown in FIG. 3(b), the pair of MR elements 15A and 15B are arranged along the rotation direction B of the rotation plate 20. The pair of MR elements 15A and 15B are arranged along the rotation direction B of the rotation plate 20, and consequently the MR element 15A receives the changing magnetic field before the MR element 15B, and the MR element 15B receives the changing magnetic field after the MR element 15A. As stated above, since the changing magnetic field is applied to the pair of MR elements 15A and 15B at different timings, the changes of resistance values of the MR elements 15A and 15B also occur at different timings.

The rotation plate 20, together with the internal combustion engine, rotates around axial line C—C shown in FIG. 3(a). In FIG. 3(a), the permanent magnet 14 is magnetized in the radius direction of the rotation plate 20. The pair of MR elements 15A and 15B are arranged on the end surface of the permanent magnet 14 at the rotation plate 20 side.

Figure 4:
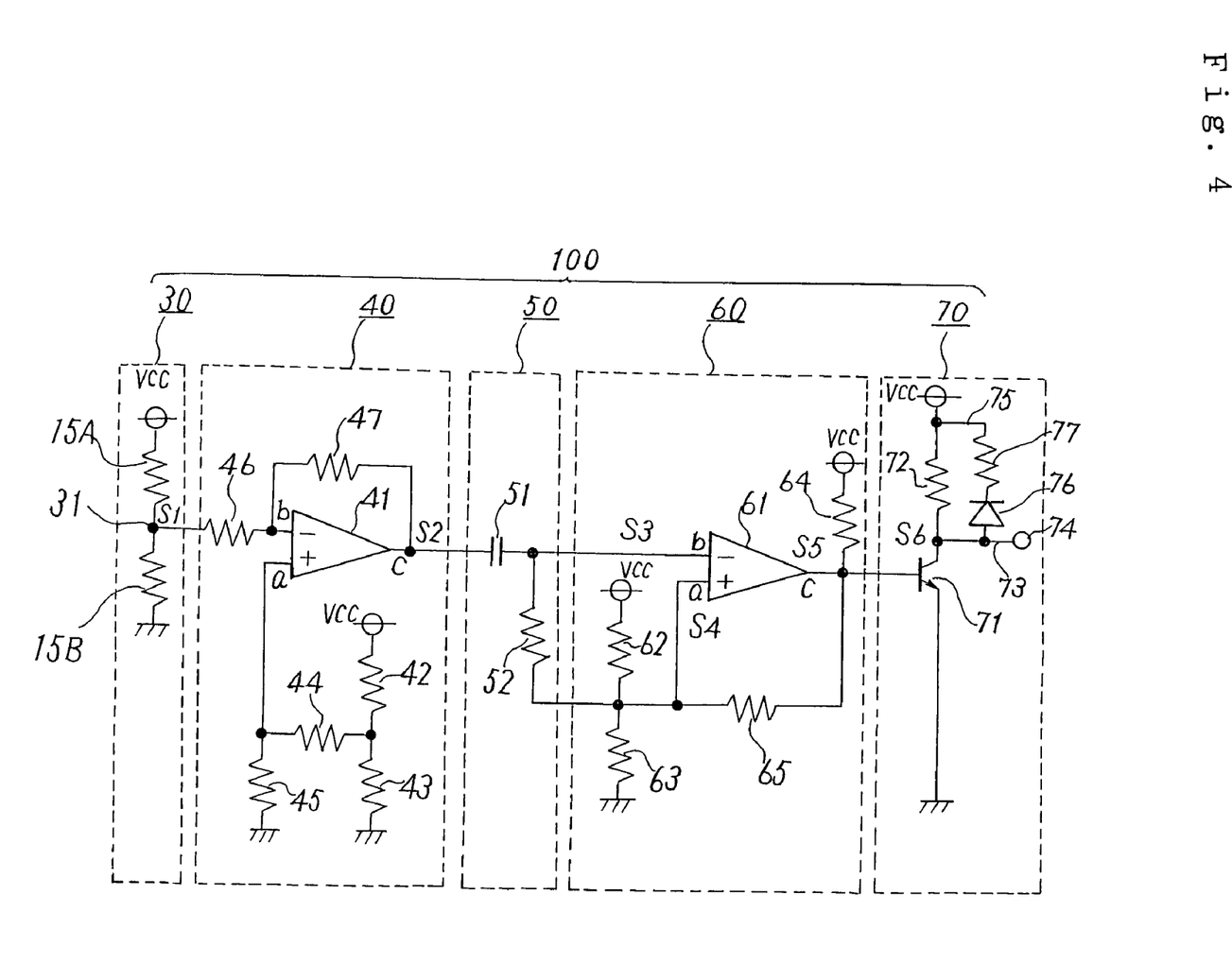
FIG. 4 is an electric circuit diagram showing a signal processing circuit in embodiment 1.

FIG. 4 shows a signal processing circuit 100 in the rotation information detecting apparatus of embodiment 1. This signal processing circuit 100 is mounted on the electric circuit board 13 shown in FIG. 2, and includes a detection circuit 30, a differential amplification circuit 40, an alternating current coupling circuit 50, a comparison circuit 60 and an output circuit 70.

The detection circuit 30 includes a direct current power supply terminal VCC, and the pair of MR elements 15A and 15B. The pair of detection elements 15A and 15B are connected in series to each other between the direct current power supply terminal VCC and a reference potential point such as the ground, and constitute a bridge circuit. The pair of MR elements 15A and 15B are connected to each other at a connection point 31. This connection point 31 becomes an output terminal of the detection circuit 30, and a detection signal S1 is outputted from this connection point 31.

When the convex part 21b formed on the outer peripheral surface 20a of the rotation plate 20 approaches the MR elements 15A and 15B, the resistance value of the detection element 15A is first decreased, and then, the resistance value of the detection element 15B is decreased. When the resistance value of the MR element 15A is decreased, the detection signal S1 is increased, and when the resistance value of the MR element 15B is decreased after that, the detection signal is decreased.

The differential amplification circuit 40 includes an amplifier 41 and resistors 42, 43, 44, 45, 46 and 47. The amplifier 41 includes a plus input a, a minus input b and an output c. The resistors 42, 43, 44, and 45 are connected between the direct current power supply terminal VCC and the reference potential point such as the ground, and gives a specific potential to the plus input a. The resistor 46 is connected between the minus input b and the connection point 31 of the detection circuit 30, and supplies the detection signal S1 to the minus input b. The resistor 47 is a feedback resistor between the minus input b and the output c. The amplifier 41 of the differential amplification circuit 40 amplifies the detection signal S1 and outputs an amplified signal S2 at the output c.

The comparison circuit 60 includes a comparator 61 and resistors 62, 63, 64 and 65. The comparator 61 includes a plus input a, a minus input b and an output c. The resistors 62 and 63 are connected in series to each other between the direct current power supply terminal VCC and the reference potential point, and give a comparison potential of VCC/2 to the plus input a. The resistor 64 is connected between the direct current power supply terminal VCC and the output c. The resistor 65 is a feedback resistor connected between the output c and the plus input a.

The output c of the amplifier 41 of the differential amplification circuit 40 is connected to the comparison circuit 60 through the alternating current coupling circuit 50. The alternating current coupling circuit 50 includes a coupling capacitor 51 and a resistor 52. The coupling capacitor 51 is connected between the output c of the amplifier 41 and the minus input b of the comparator 61. The resistor 52 is connected between a terminal of the coupling capacitor 51 at the comparator 61 side and the plus input a of the comparator 61.

The amplified signal S2 includes a direct current component as well as an alternating current component obtained by amplifying the detection signal S1. The coupling capacitor 51 of the alternating current coupling circuit 50 cuts the direct current component, and generates an alternating current signal S3 obtained by amplifying the detection signal S1. The alternating current signal S3 is supplied to the minus input b of the comparator 61. A comparison signal S4 is supplied to the plus input a of the comparator 61. Since the feedback resistor 65 is connected between the output c of the comparator 61 and the plus input a, the comparison signal S4 is inverted up/down with respect to the comparison potential of VCC/2 each time a comparison output S5 is outputted. The comparison output S5 is outputted from the output c of the comparator 61. When the alternating current signal S3 becomes larger than the comparison signal S4, the level of the comparison output S5 is lowered, and when the alternating current signal S3 becomes lower than the comparison signal S4, the level is raised.

The output circuit 70 includes an output transistor 71, an output resistor 72, an output line 73, an output terminal 74, and a noise suppression circuit 75. The output transistor 71 is an NPN bipolar transistor. The base of the output transistor 71 is directly connected to the output c of the comparator 61 of the comparison circuit 60, the collector is connected to the direct current power supply terminal VCC through the output resistor 72, and the emitter is directly connected to the reference potential point. The output line 73 connects the collector of the output transistor 71 to the output terminal 74.

The output circuit 70 generates an output signal S6 in the collector of the output transistor 71, that is, the output line 73 on the basis of the comparison output S5. The output signal S6 is transmitted to the terminal part 11 shown in FIG. 1, and is sent to the not-shown computer unit. The output signal S6 is a binary signal changing between the high level HIGH and the low level LOW.

The noise suppression circuit 75 is connected between the output line 73 and the direct current power supply terminal VCC. The noise suppression circuit 75 includes a diode 76 and a current limiting resistor 77. The anode of the diode 76 is connected to the output line 73, and the cathode of the diode 76 is connected to the direct current power supply terminal VCC through the current limiting resistor 77.

Figure 5:
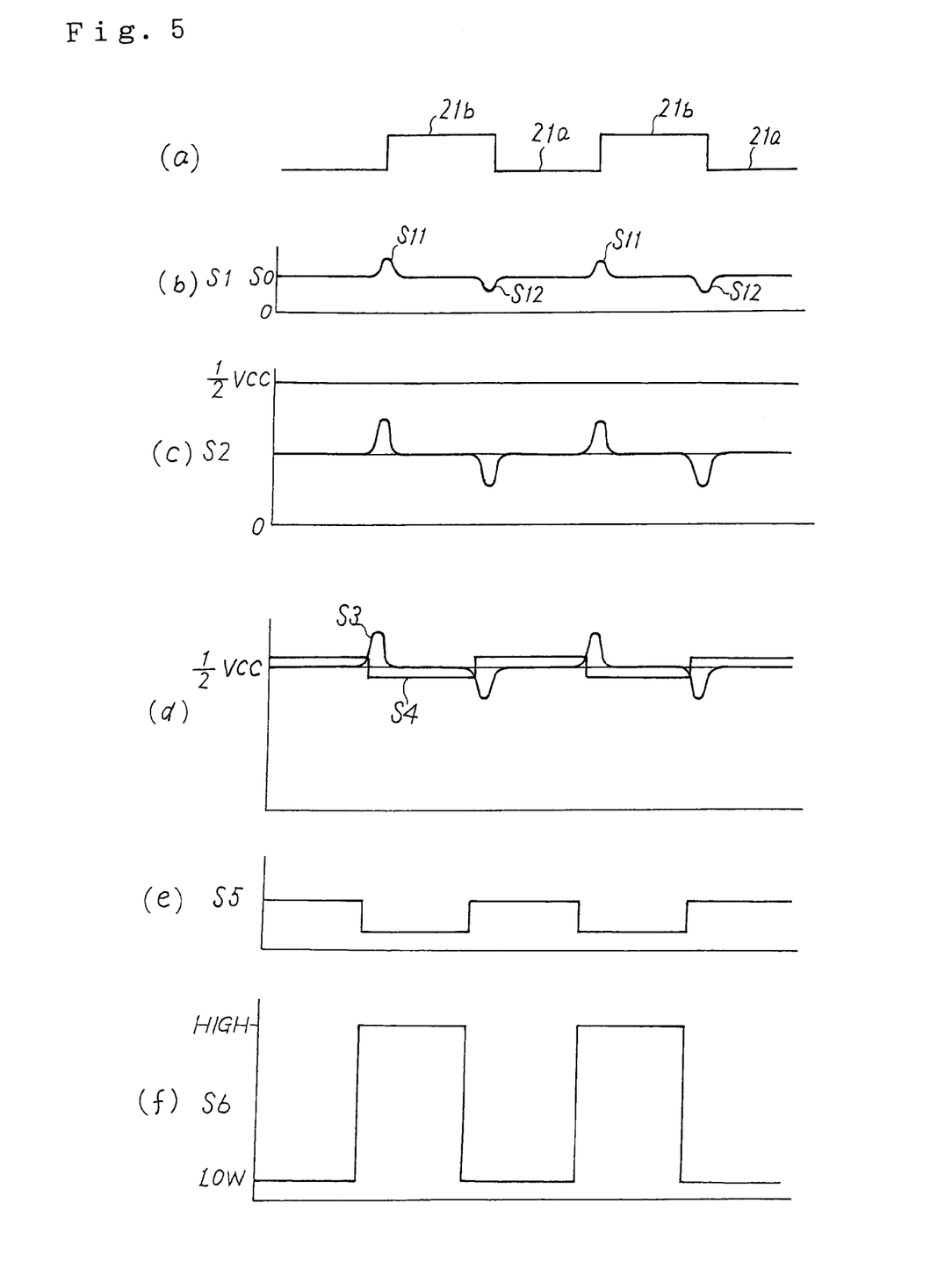

FIGS. 5(a) to 5(f) show the operation of the signal processing circuit 100 in the case where noise is not superimposed. FIG. 5(a) is a developed view of the concave parts 21a and the convex parts 21b on the outer peripheral surface 20a of the rotation plate 20, and FIGS. 5(b) to 5(f) correspond to FIG. 5(a) and show signal waveforms of respective parts of the signal processing circuit 100. FIG. 5(b) shows the waveform of the detection signal S1 outputted from the detection circuit 30. FIG. 5(c) shows the waveform of the amplified signal S2 obtained at the output c of the amplifier 41 of the differential amplification circuit 40. FIG. 5(d) shows the waveform of the alternating current signal S3 applied to the minus input b of the comparator 61 of the comparison circuit 60 and the waveform of the comparison signal S4 applied to the plus input a. FIG. 5(e) shows the comparison output S5 obtained at the output c of the comparator 61, and FIG. 5(f) shows the waveform of the output signal S6 obtained at the output line 73 of the output circuit 70.

As shown in FIG. 5(b), the detection signal S1 outputted from the detection circuit 30 includes a first change signal S11 higher than a reference level S0 and a second change signal S12 lower than the reference level S0. The first change signal S11 is generated when the convex part 21b approaches the detection element 15, and the second change signal S12 is generated when the convex part 21b goes away from the detection element 15. When the convex part 21b approaches the detection element 15, since the convex part first approaches the MR element 15A, the first change signal S11 is raised at this time, and when the convex part 21b approaches the MR element 15B after that, the first change signal S11 is lowered. When the convex part 21b goes away from the detection element 15, since the convex part first goes away from the MR element 15A, the second change signal S12 is lowered at this time. Thereafter, when the convex part goes away from the MR element 15B, the second change signal S12 is raised. The first and the second change signals S11 and S12 are signals having magnitudes proportional to the direction change of the changing magnetic field resulting from the movement of the convex part 21b.

As shown in FIG. 5(c), the amplified signal S2 obtained by amplifying the detection signal S1 is generated at the output c of the amplifier 41 of the differential amplification circuit 40. The coupling capacitor 51 of the alternating current coupling circuit 50 removes the direct current component contained in the amplified signal S2, and generates the alternating current signal S3 shown in FIG. 5(d). This alternating current signal S3 is supplied to the minus input b of the comparator 61. Since the comparison signal S4 shown in FIG. 5(d) is applied to the plus input a of the comparator 61, the comparator 61 compares the alternating current signal S3 with the comparison signal S4, and generates the comparison output S5 shown in FIG. 5(e). The comparison output S5 is supplied to the base of the output transistor 71, and the output signal S6 shown in FIG. 5(f) is outputted to the output line 73.

Figure 6:
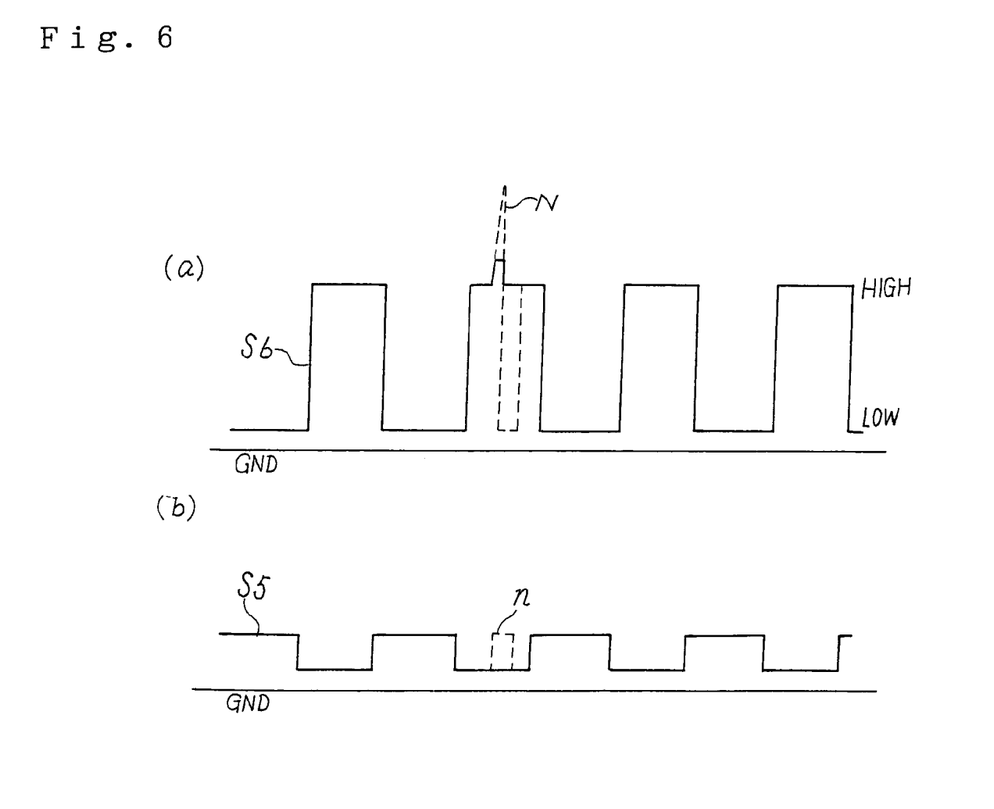

FIGS. 6(a) and 6(b) show the noise suppression operation by the noise suppression circuit 75. FIG. 6(a) shows the output signal S6 in the output line 73, and FIG. 6(b) shows the comparison output S5 corresponding thereto. In the internal combustion engine, since, for example, a high voltage ignition pulse is generated for ignition at an ignition timing, there is a case where a noise N is induced in the output line 73 by the ignition pulse or the like.

When the output transistor 71 is in the off state and the output line 73 is kept at the high level HIGH, when the noise N indicated by a dotted line in FIG. 6(a) is superimposed, there is a fear that the noise N is superimposed as a noise n on the comparison output S5 supplied to the base of the output transistor 71 through stray capacitance between the collector and the base of the output transistor 71. The noise Nerroneously turns on the output transistor 71, and cuts off the output signal S6 of the output line 73. The cutoff of the output signal S6 results in the error of detection of the rotation angle of the internal combustion engine.

The diode 76 of the noise suppression circuit 75 is turned on when the potential of the output line 73 becomes larger than the potential of the power supply terminal VCC by the noise N, diverts the noise N to the power supply terminal VCC, and clamps the noise N as indicated by a solid line in FIG. 6(a). On the basis of the clamping of the noise N by the diode 76, the noise N is prevented from being superimposed on the output transistor 71, and the cutoff of the output signal S6 is avoided.

As described above, in embodiment 1, since the noise suppression circuit 75 for diverting the noise N superimposed on the output line 73 to the power supply terminal VCC is connected between the output line 73 and the power supply terminal VCC, there is an effect that the erroneous detection of the rotation information due to the noise N can be avoided.

EMBODIMENT 2

Figure 7:
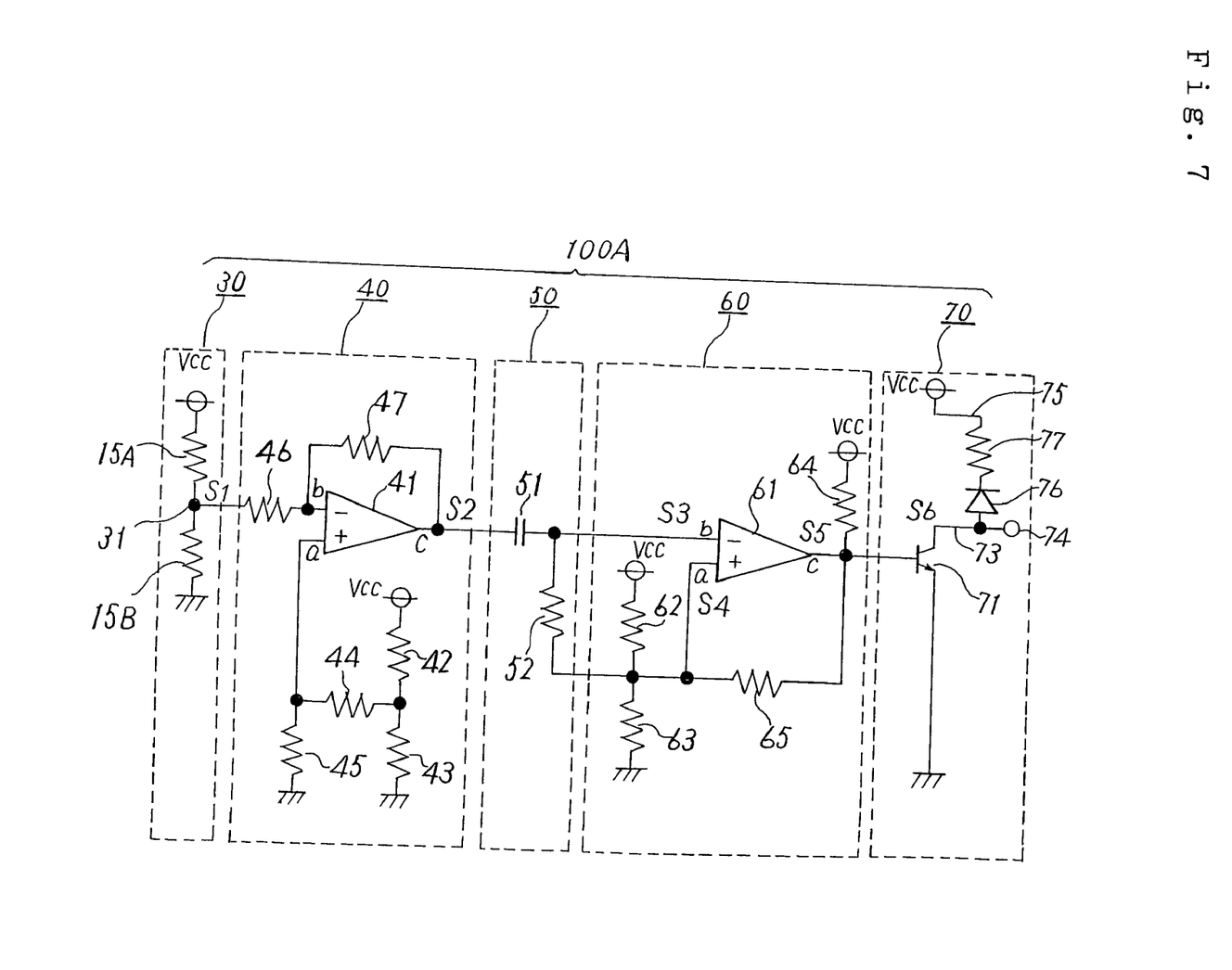
FIG. 7 is an electric circuit diagram showing a signal processing circuit of a rotation information detecting apparatus of embodiment 2 of the invention.

FIG. 7 shows a signal processing circuit 100A of a rotation information detecting apparatus of embodiment 2 of the invention. In the signal processing circuit 100A of this embodiment 2, as compared with the signal processing circuit 100 in embodiment 1 shown in FIG. 4, the output resistance 72 of the output circuit 70 is deleted. The other structure is the same as embodiment 1.

In embodiment 1, since the input circuit 70 has the output resistor 72, the noise N superimposed on the output line 73 can be diverted to the power supply terminal VCC through the output resistance 72 in addition to the noise suppression circuit 75 to some degree. However, in embodiment 2, the output resistor 72 is deleted, and consequently there is no passage, other than the noise suppression circuit 75, through which the noise N is diverted to the power supply terminal VCC. Accordingly, in embodiment 2, the noise N is more effectively suppressed by the noise suppression circuit 75.

EMBODIMENT 3

Figure 8:
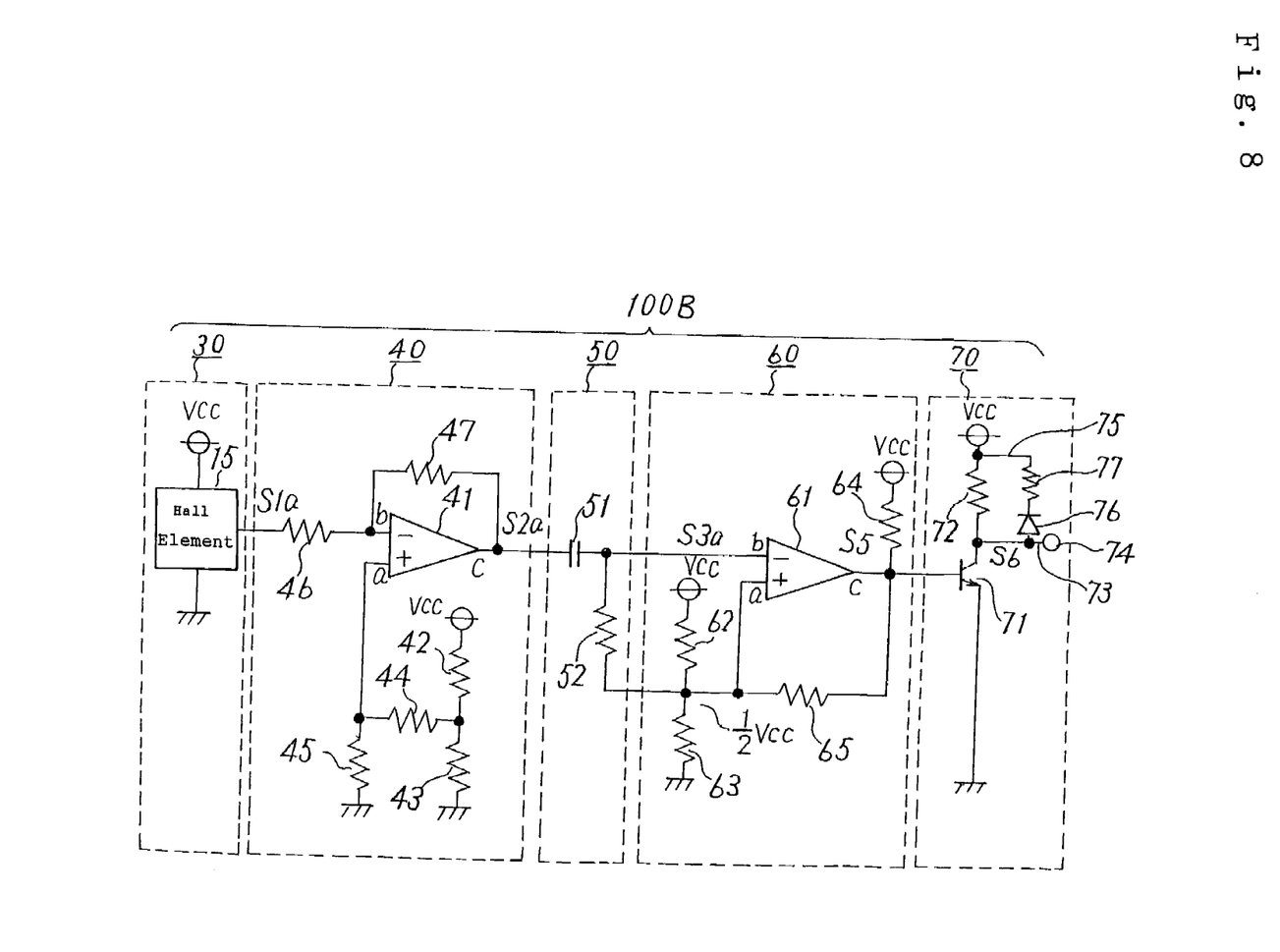
FIG. 8 is an electric circuit diagram showing a signal processing circuit of a rotation information detecting apparatus of embodiment 3 of the invention.

FIG. 8 shows a signal processing circuit 100B of a rotation information detecting apparatus of embodiment 3 of the invention. FIGS. 9(a) to 9(f) show the signal processing operation of the signal processing circuit 100B.

In embodiment 3, a hole element 15C is used as a detection element 15 of a detection circuit 30, and the other structure is the same as embodiment 1. The hole element 15C generates a detection signal S1a having a magnitude proportional to an intensity change of a magnetic flux of a changing magnetic field applied thereto. When a convex part 21a is opposite to the detection element 15C according to the rotation of a rotation plate 20, a high intensity magnetic flux is applied, and when a concave part 21a is opposite to the detection element 15C, a low intensity magnetic flux is applied. The hole element 15C generates the detection signal S1a proportional to the magnetic flux intensity in response to the change of the magnetic flux intensity.

Figure 9:
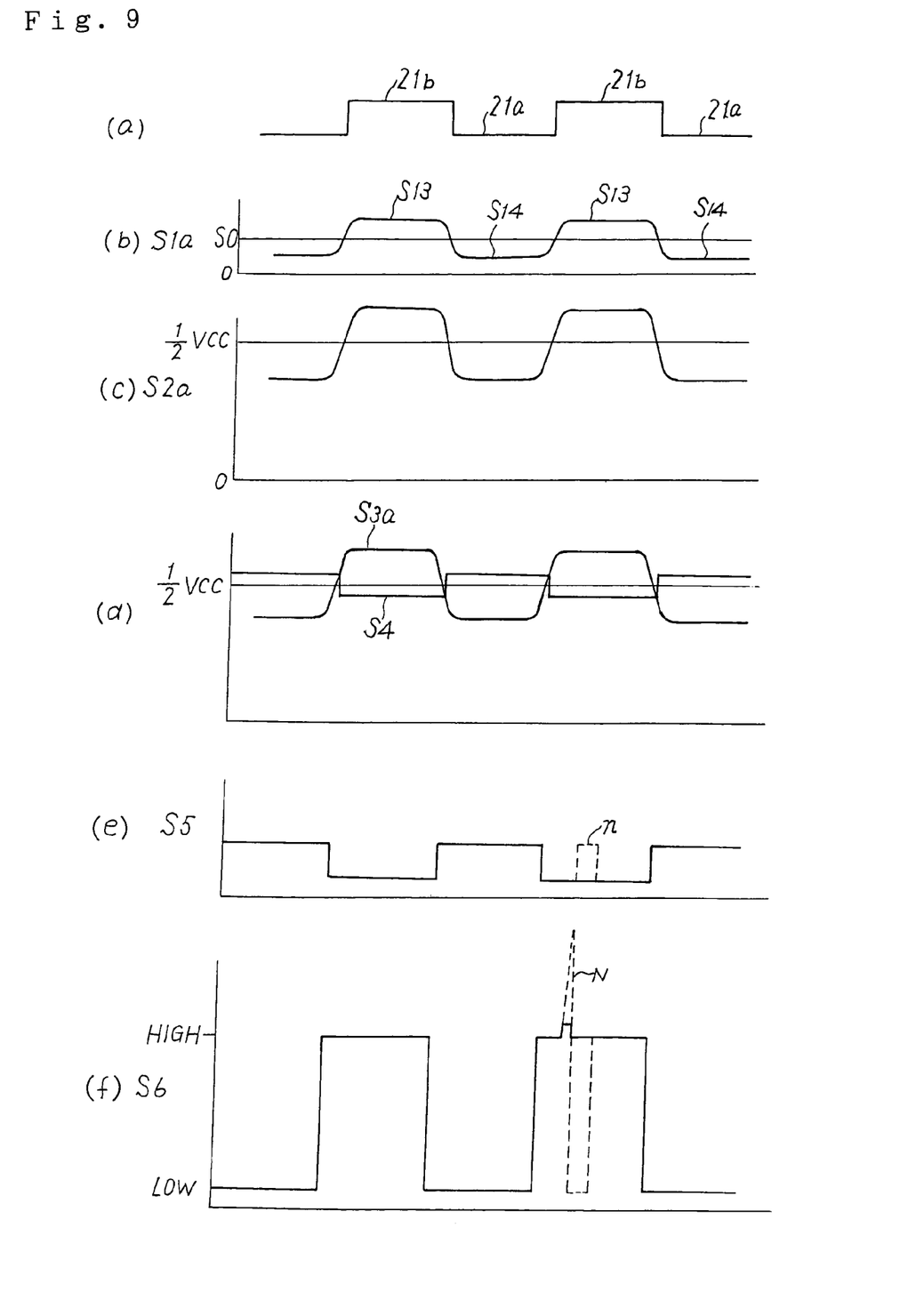

FIGS. 9(b) to 9(f) correspond to the concave parts 21a and the convex parts 21b on the outer peripheral surface 20a of the rotation plate 20 shown in FIG. 9(a) and show signal waveforms of respective parts of the signal processing circuit 100B in embodiment 3.

FIG. 9(b) shows the waveform of the detection signal S1a outputted from the detection circuit 30. FIG. 9(c) shows the waveform of an amplified signal S2a obtained at an output c of an amplifier 41 of a differential amplification circuit 40. FIG. 9(d) shows the waveform of an alternating current signal S3a applied to a minus input b of a comparator 61 of a comparison circuit 60, and the waveform of a comparison signal S4 applied to a plus input a. FIG. 9(e) shows a comparison output S5 at an output c of a comparator 61, and FIG. 9(f) shows the waveform of an output signal S6 obtained in an output line 73 of an output circuit 70.

The detection signal S1a outputted from the detection circuit 30 includes, as shown in FIG. 9(b), a first change signal S13 higher than a reference level S0 and a second change signal S14 lower than the reference level S0. The first change signal S13 is generated when the convex part 21b is opposite to the detection element 15, and the second change signal S14 is generated when the concave part 21a is opposite to the detection element 15.

As shown in FIG. 9(c), the amplified signal S2a obtained by amplifying the detection signal S1a is generated at the output c of the amplifier 41 of the differential amplification circuit 40. A coupling capacitor 51 of an alternating current coupling circuit 50 removes a direct current component contained in the amplified signal S2a, and generates the alternating current signal S3a shown in FIG. 9(d). The alternating current signal S3a is supplied to the minus input b of the comparator 61. The comparison signal S4 shown in FIG. 9(d) is applied to the plus input a of the comparator 61, and the comparator 61 generates the comparison output S5 shown in FIG. 9(e). The comparison output S5 is supplied to the base of the output transistor 71, and the output signal S6 shown in FIG. 5(f) is outputted to the output line 73. The comparison signal S4, the comparison output S5, and the output signal S6 have substantially the same waveforms as the comparison output S4 shown in FIG. 5(d), the comparison output S5 shown in FIG. 5(e) and the output signal S6 shown in FIG. 5(f).

FIG. 9(f) also shows a suppression operation of noise by a noise suppression circuit 75 in the signal processing circuit 100B of FIG. 8. The noise suppression operation is the same as the noise suppression operation shown in FIG. 6. As stated above, also in embodiment 3, the noise suppression circuit 75 including a diode 76 and a current limiting resistor 77 is connected between the output line 73 and the power supply terminal VCC, so that the same effect as embodiment 1 can be obtained.

Incidentally, instead of the hall element 15C of embodiment 3, a semiconductor magnetic resistance element having the same performance can be used. The semiconductor magnetic resistance element generates a detection signal proportional to the intensity change of an applied magnetic flux similarly to the hall element 15C.

The rotation information detecting apparatus of the invention can be widely applied to a use for detecting rotation information, such as angle information, from an object to be detected. The object to be detected is, for example, an internal combustion engine.

What is claimed is:

1. A rotation information detecting apparatus which generates a periodic changing magnetic field according to rotation of a rotation object and detects rotation information of the rotation object on the basis of the periodic changing magnetic field, the rotation information detecting apparatus comprising:
    a signal processing circuit for generating a binary output signal changing between a high level and a low level according to the rotation of the rotation object,
    wherein the signal processing circuit includes
    an output transistor for generating the binary output signal,
    an output line connected to the output transistor for outputting the binary output signal,
    a power supply terminal for the output transistor, and
    a noise suppression circuit connected between the output line and the power supply terminal for by-passing noise superimposed on the output line to the power supply terminal.

2. A rotation information detecting apparatus according to claim 1, wherein the noise suppression circuit includes a diode and a current limiting resistor, and when a potential of the output line becomes larger than a power supply voltage of the power supply terminal by the noise, the diode is turned on, and the noise is by-passed to the power supply terminal.

3. A rotation information detecting apparatus according to claim 2, wherein an output resistor is connected in parallel to the noise suppression circuit between the output line and the power supply terminal.

4. A rotation information detecting apparatus according to claim 1, further comprising a detection element for generating a detection signal by receiving the periodic changing magnetic field,
    wherein the output transistor generates the output signal on the basis of the detection signal.

5. A rotation information detecting apparatus according to claim 4, wherein the signal processing circuit further includes a differential amplification circuit for amplifying the detection signal, and a comparison circuit connected to an output of the differential amplification circuit through an alternating current coupling circuit, and an output of the comparison circuit is supplied to the output transistor.

6. A rotation information detecting apparatus according to claim 4, wherein the detection element is a magnetic resistance element, and the magnetic resistance element receives the periodic changing magnetic field to change its electric resistance value and generates the detection signal.

7. A rotation information detecting apparatus according to claim 4, wherein the detection element is a hall element, and the hall element receives the periodic changing magnetic field to generate the detection signal.

* * * * *